United States Patent [19]

Rabe

[11] Patent Number: 4,637,768

[45] Date of Patent: Jan. 20, 1987

[54] NAIL-TYPE FASTENER, AND PROCESS FOR MANUFACTURING SUCH FASTENERS

[76] Inventor: Karl L. G. Rabe, Björnbärsvägen 35, S-69147 Karlskoga, Sweden

[21] Appl. No.: 504,686

[22] PCT Filed: Sep. 23, 1982

[86] PCT No.: PCT/SE82/00293

§ 371 Date: May 25, 1983

§ 102(e) Date: May 25, 1983

[87] PCT Pub. No.: WO83/01097

PCT Pub. Date: Mar. 31, 1983

[30] Foreign Application Priority Data

Sep. 28, 1981 [SE] Sweden .............................. 8105713

[51] Int. Cl.$^4$ .............................................. F16B 15/08
[52] U.S. Cl. .................................... 411/452; 411/922;
411/487; 10/62
[58] Field of Search ............... 411/452, 453, 463, 464,
411/487, 490, 492, 439, 446, 451, 488, 489, 394,
387, 386, 418, 922; 10/34, 62, 66, 58, 63, 10 R;
76/101 B

[56] References Cited

U.S. PATENT DOCUMENTS

| 303,748 | 8/1884 | Perkins | 10/62 |
|---|---|---|---|
| 393,885 | 12/1888 | Clifford et al. | 411/452 |
| 895,080 | 8/1908 | Eisenreich | 411/452 |
| 1,360,344 | 11/1920 | Wood et al. | |
| 2,070,766 | 2/1937 | Wilson | |
| 2,412,517 | 12/1946 | Klein | 411/452 |
| 2,649,009 | 8/1953 | Selby | 411/453 |
| 2,821,727 | 2/1958 | Corckran | |

FOREIGN PATENT DOCUMENTS

| 676231 | 5/1939 | Fed. Rep. of Germany . | |
| 839889 | 5/1952 | Fed. Rep. of Germany | 411/452 |
| 888485 | 9/1953 | Fed. Rep. of Germany . | |
| 1552147 | 2/1970 | Fed. Rep. of Germany . | |
| 2408525 | 7/1977 | Fed. Rep. of Germany . | |
| 423077 | 2/1910 | France . | |
| 408268 | 3/1910 | France . | |
| 940244 | 12/1948 | France . | |
| 10180 | 9/1910 | United Kingdom . | |
| 23572 | 6/1914 | United Kingdom . | |
| 580272 | 9/1946 | United Kingdom . | |
| 629722 | 11/1949 | United Kingdom . | |
| 2034223A | 6/1980 | United Kingdom . | |

Primary Examiner—Gary L. Smith
Assistant Examiner—Neill Wilson
Attorney, Agent, or Firm—Pennie & Edmonds

[57] ABSTRACT

Nail-type fastener, comprising an elongated shank (1) with a head at one end, and a point at the other end. The nail shank has three symmetrically placed, longitudinal grooves (4) separated by longitudinal ridges (8) with a cross-sectionally arcuate outer side (9). The grooves have flat, concave or cross-sectionally V-shaped bottom surfaces (27;17;7) and usually side flank surfaces (5) arranged obliquely thereto which connect to the bottom surface via individual corners (6) of small radius of curvature. The cross-sectional shape selected provides a nail with high flexural rigidity and high pull grip with comparatively low weight. The fastener or nail is produced starting from a cross-sectionally circular nail wire stock which is profiled in two coldrolling steps. In the first step, the nail wire passes through a first roller trio, the section rollers of which roll cross-sectionally arcuate guide grooves into the nail wire stock. In the second step, the nail wire passes through a second roller trio, the rollers of which engage the guide grooves centrally thereto and produced a deepening of these grooves into deep grooves. The head is then upset on one end of the shank, and a point is made at the other end of the shank, as the finished nail is thereby separated.

7 Claims, 8 Drawing Figures

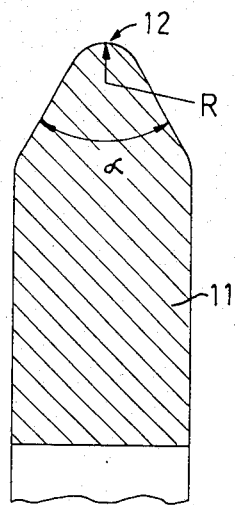
FIG. 4
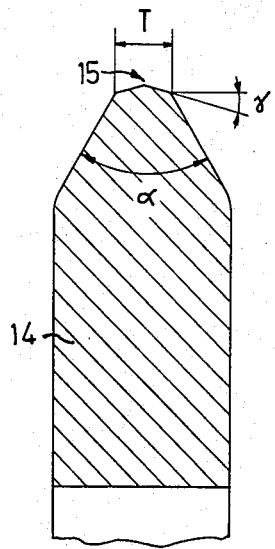 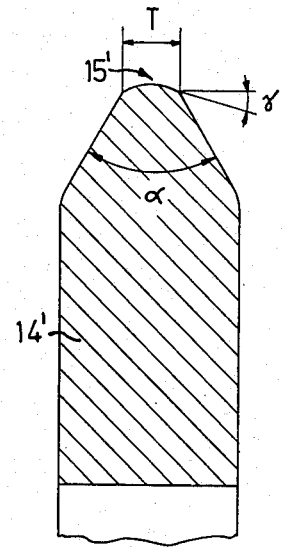 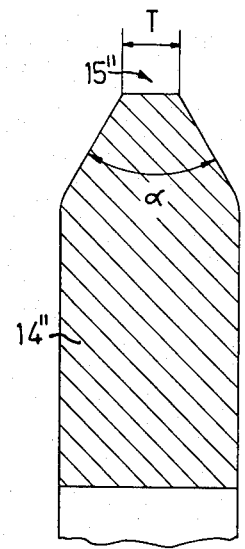
FIG. 5     FIG. 5a     FIG. 5b

NAIL-TYPE FASTENER, AND PROCESS FOR MANUFACTURING SUCH FASTENERS

BACKGROUND OF THE INVENTION

1. Field of the Invention

The invention relates firstly to a nail-type fastener, according to the preamble to claim 1, and secondly to a process for manufacturing such fasteners, as according to the preamble to claim 7.

2. Description of the Prior Art

A disadvantage of most known nail-tyyes is that they have a disadvantageous ratio between the amount of material in the nail and the size of the frictional surface of the nail. This is especially true of common round wire nails made of wire with a round cross section. The weight per thousand nails is unfavourably high for the round wire nail. Another disadvantage of this type of nail is that it easily gives rise to severe cracking in the wood.

In order to avoid said disadvantages, several types of nails have been developed with three longitudinal flanges (splines) or with a Y-shaped cross section. Examples of such nails are given in British Patent Specification 10 180 from 1910 and Swedish Patent Specification 127 167. These known designs have not, however, provided a satisfactory solution of the above-mentioned problems, and therefore these nails have not come into wide-spread use.

The purpose of the present invention is to achieve a new type of nail in which the material is utilized more efficiently (than in known nails) to obtain improved strength characteristics, primarily increased flexural rigidity and pull grip. In other words, this new type of nail is to have, with the same nominal size as a conventional, known nail, at least the same flexural rigidity, but using a smaller amount of material in the nail; i.e. the new type of nail is to have a lower weight than the corresponding conventional nail. It must also be possible to produce the nail wire for the new nail more rapidly from a wire of circular cross section than is possible for conventional, rolled nail wires.

SUMMARY OF THE INVENTION

The above purposes can be achieved according to the invention by making in each of the lateral outside surfaces (of the fastener's shank) a groove extending along the shank, said groove normally being defined transversely by two opposing side flank surfaces (planar or arcuate) both of which connect via individual corners, which are preferably sharp or of small radius, to the bottom surface of the groove which is flat, or which is inclined inwards and downwards from the sides towards the center of the groove, the lateral surfaces of the shank which are provided with grooves separated from each other transversely by ridges running along the shank with arcuate cross-sectional outer contours.

Thus the bottom of the grooves can consist of a planar bottom surface, a concave bottom surface, the "halves" of which are inclined inwards and downwards towards the center of the groove, or else the bottom surface can consist of two oblique flat surfaces (bottom halves) which converge at an angle to each other at the center of the groove. In the latter case, the bottom of the groove is thus V-shaped in cross section. The shape of the bottom surface can also be shaped so that its cross-sectional profile line consists of both irregularly inclined (sloping) or completely straight (planar) portions.

Preferably, the grooves have the same cross-sectional shape and are symmetrically located relative to the longitudinal center line of the shank. In certain cases it is preferable that the grooves have in cross section a V-shaped bottom surface in which the flat halves form an obtuse angle with each other, said angle suitably lying in the interval 130°–170°, and preferably being about 150°. It is also suitable that the angle between an imaginary plane (which contains the longitudinal center line of the shank and the center of the bottom surface) and the side flank surfaces connecting to the bottom surface be acute. Suitably, the angle can be about 10°–30°, and in many cases a suitable value is about 20°. The ratio between the greatest depth of the grooves and the cross dimension of the shank should normally be at least 10% but should generally not exceed 30%. For many nail dimensions, about 20% can be suitable. Furthermore, the width of the bottom surface should not normally exceed 50% of the cross dimension of the shank. As was already mentioned above, the invention also relates to a process for manufacturing this type of fastener or nail.

The novel and special feature of the process is that the desired cross-sectional shape of the shank is achieved in two separate cold-rolled steps. In the first of the steps, three spaced, relatively shallow guide grooves, concave and arcuate in cross section, are rolled simultaneously into the nail wire stock longitudinally to the same at symmetrically placed locations on the lateral surface of the said wire. In the second step, deepened grooves are rolled into the nail wire stock starting from the guide grooves by applying deepening rollers in the center thereof to achieve a deepening of the guide grooves into deep grooves, so that the shank material during rolling flows both transversely as well as longitudinally to the shank. Deepening rollers of such a profile are used that each of the finished deep grooves is limited laterally by two opposing side flank surfaces both of which connect via individual corners to the groove bottom surface, which is flat or which is inclined inwards and downwards from the sides towards the center of the groove. The finished deep grooves will then be separated by ridges of convex arcuate cross-sectional contour. The thus completely profiled shank is thereafter, in a manner known per se, provided by cold-upsetting with a head at one end and is pointed at the deswred distance from the head and separated.

To obtain the desired, improved strength characteristics of the nail (the fastener), the deep grooves must be made so deep and wide that the material in the shank not only spreads in the longitudinal direction of the nail wire during rolling, which is the normal case in nail wire stock manufacture, but laterally as well thereby achieving a compression of the material between the grooves, in and beneath the ridges which constitute the longitudinal edges of the nail. It is namely this compression of the material which provides increased flexural rigidity in the finished nail, beyond the usual strength of the shank.

The advantage of the invention is that it is possible to manufacture a nail with the same nominal size and flexural rigidity as a conventional nail but with a weight which is essentially lower than the weight of said nail.

As was pointed out above, the fluted (channeled) nail wire is made by rolling in two cold-rolling steps. The reason why two steps are necessary is that it is not possible to achieve in a single rolling step deep enough profiled grooves to obtain the above-mentioned lateral material flow.

The roller trios in the two steps are suitably included in a pulling mill, and the section rollers in the steps have profiles which make optimum forming of the rolled nail wire possible.

The two cold-rolling steps are thus placed in sequence at two separate locations along a straight portion of the nail wire stock led (pulled) through the steps, whereby the guide grooves are rolled into the nail wire in the first step by means of a first section roller trio, the rollers of which engage the nail wire stock with their peripheral edge portions which are preferably circularly arcuate in cross section, the deep grooves being rolled into the nail wire stock in the second step by means of a second section roller trio, the deepening rollers of which engage the guide grooves centrally thereto by means of their cross-sectionally straight or convexly curved peripheral edge portions.

In order for the deep grooves to be placed symmetrically on the nail shank, the three rollers in the respective cold-rolling steps rotate about shafts lying in a plane perpendicular to the straight nail wire stock at the step in question. The rotational shafts are arranged with 120° spacing in said normal plane.

BRIEF DESCRIPTION OF THE DRAWINGS

Both the fastener or nail according to the invention and the process for its manufacture will now be described below and exemplified with reference to the accompanying drawings, of which

FIGS. 4 and 5, 5a, 5b show in partial section some types of section rollers which can be used in the first and second cold-rolling steps.

DESCRIPTION OF THE PREFERRED EMBODIMENT

Figure 1:
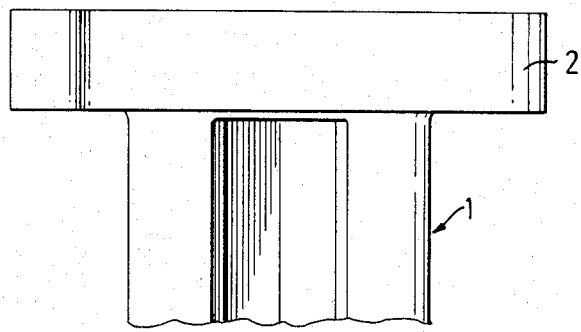
FIGS. 1 and 2, 2a show a side view and a cross-sectional view, respectively, of a nail according to the invention.
Figure 2:
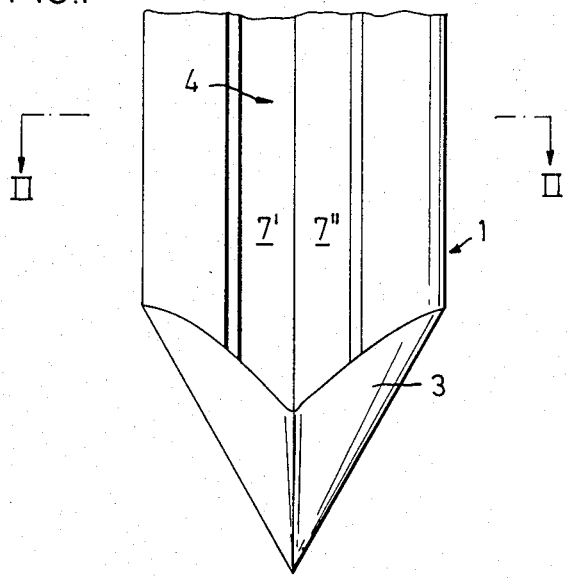
Figure 2:
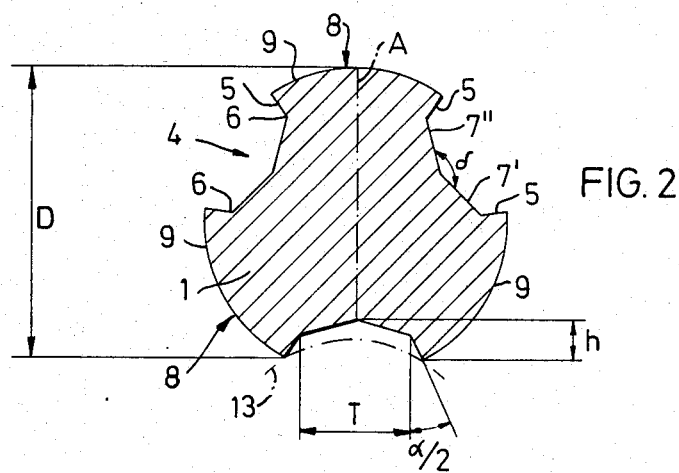
Figure 2A:
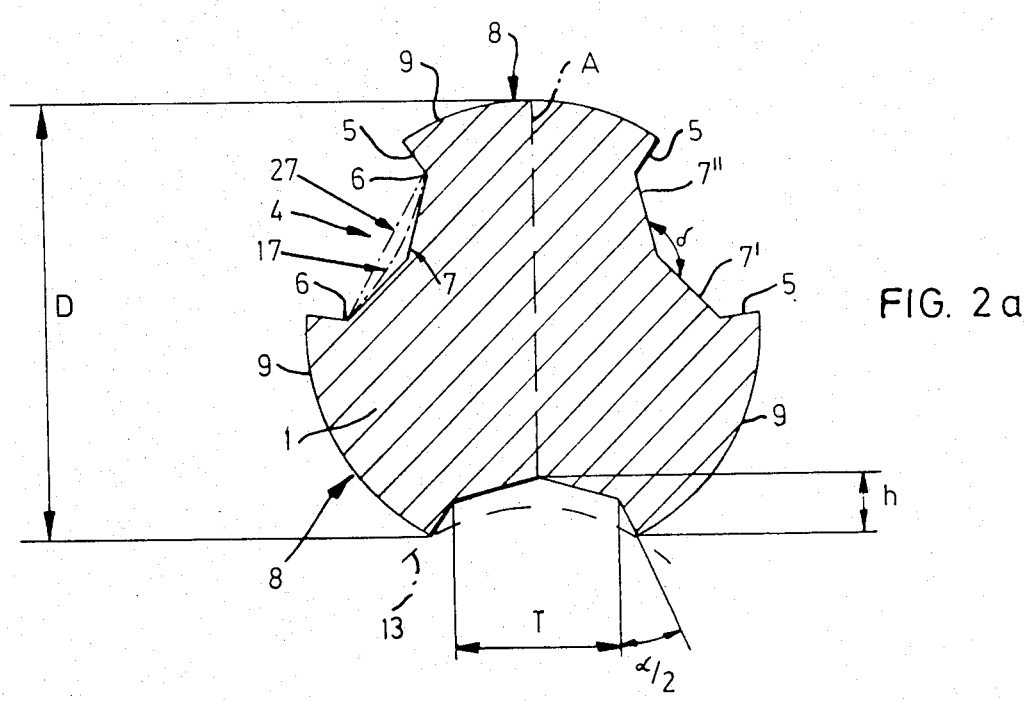

The nail shown in FIGS. 1, 2 and 2a according to the invention comprises a straight, elongated shank 1 which is provided at one end with an upset head 2 and at the other end with a point 3. In the lateral outer surface of the nail there are three symmetrically placed grooves 4 running longitudinally to the nail shank, each of which is limited laterally by two flat side flank surfaces 5 which connect, via individual corners 6, to the groove bottom surface 7 which is V-shaped in cross section and which consists of two flat bottom halves 7' and 7". The grooves 4 are thus separated laterally from each other by ridges 8 between them running longitudinally to the shank, with arcuate outer contours 9. The corners 6 at the inner edges of the side flank surfaces 5 are sharp or are of small radius.

FIG. 2a shows (in the left upper groove 4), in addition to the bottom surface 7 (V-shaped in cross section) drawn with a solid line, two alternative bottom surfaces which are indicated with dash-dot lines, and are designated 17 and 27 respectively. The bottom surface 17 is concave, while the bottom surface 27 is flat.

The angle $\alpha/2$ between a side flank surface 5 and the plane A can be 20° for example, while the obtuse angle $\delta$ between the planar halves 7', 7" of the bottom surface can be 150°. The greatest depth h of the grooves can for example be 20% of the cross dimension D of the shank, and the width T of the bottom surface 7', 7" normally does not exceed 50% of the cross dimension D of the shank.

A suitable process for manufacturing the nail described above will now be described with reference to FIGS. 3-5 in particular.

In manufacturing the nail, one starts with a cross-sectionally circular nail wire stock which is led (pulled) through a pulling mill comprising two roller trios VTI and VTII which achieve in two steps the desired cold-rolling of the nail wire stock into a finished profiled nail wire from which the individual nails can then be finished by upsetting of the nail head and pointing and separating the desired nail shank length.

Figure 3:
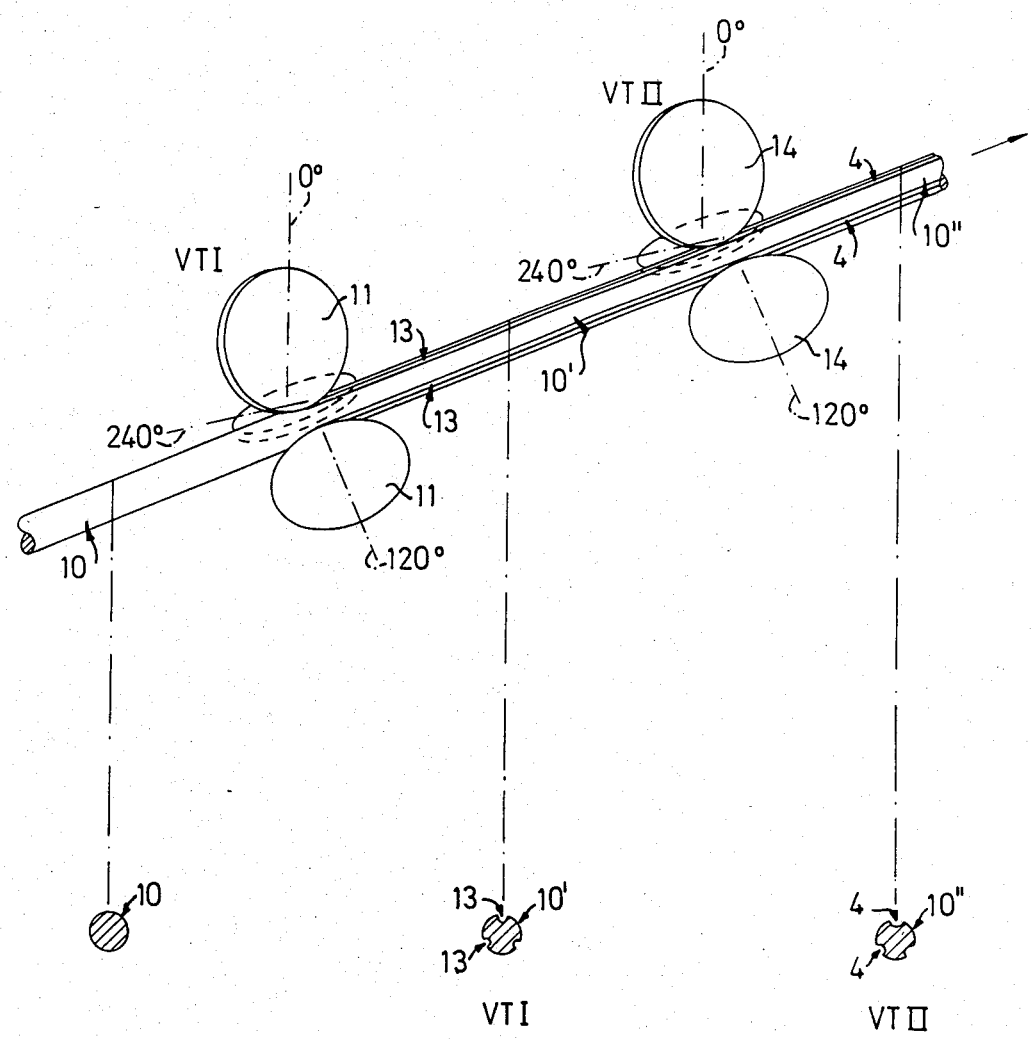
FIG. 3 shows in perspective very schematically how the section rollers in the two sequentially arranged roller trios engage the nail wire stock drawn through the steps.

FIG. 3 shows how the nail wire stock 10, which is circular in cross section, is pulled through the first roller trio VTI which comprises three section rollers 11 of the type shown in FIG. 4 arranged at 120° angles to each other. These rollers have peripheral edge portions 12 which when viewed in cross section have a circular curvature with the radius of curvature R. The section rollers 11 roll in the same time three spaced, relatively shallow, cross-sectionally concave arcuate guide grooves 13 (see FIGS. 2, 2a and 3) in the nail wire stock which is thereby given the cross-sectional shape 10' shown in FIG. 3. By arranging the section rollers 11 with 120° spacing around the lateral surface of the nail wire, the guide groove 13 will be placed symmetrically in relation to the longitudinal center line of the nail wire stock (and thereby also the nail shank).

After the nail wire in the first rolling step has been provided with said guide grooves 13, it continues into and through the second roller trio VTII which comprises three deepening rollers 14 of the type shown in FIG. 5 placed at 120° to each other. The deepening rollers, which in this case have V-shaped peripheral edge portions 15 (see FIG. 5) which form an obtuse angle in cross section, engage centrally in the guide grooves 13 and produce a deepening of the guide grooves into deep grooves 4 (see FIGS. 2, 2a and 3).

Cold-rolling the deep grooves 4 achieves the effect that the shank material flows both transversely to the shank as well as longitudinally, which provides the desired improved strength characteristics in the nail shank.

When the nail wire has passed the second rolling step (VTII), the wire has the cross-sectional shape 10" in FIG. 3, which corresponds to that shown in FIGS. 2 and 2a.

As can be seen from the cross section 10" in FIG. 3, and more clearly (on a larger scale) in FIGS. 2, 2a, the finished deep grooves 4 are characterized in that they are each limited laterally by a pair of inclined planar side flank surfaces 5, both of which connect via individual corners 6 (which are sharp or have a small radius of curvature) to the V-shaped "broken" bottom surface 7', 7" of the groove. The deep grooves 4 are separated laterally by the ridges 8 which have a concave arcuate crosssectional outer contour 9.

FIGS. 5a and 5b show in partial section two alternative embodiments of the peripheral edge portions 15' and 15" of the deepening rollers 14' and 14" respectively. With an edge portion such as 15' a bottom surface is produced such as that designated 17 in FIG. 2a. An edge portion 15" produces a bottom surface such as that designated 27 in FIG. 2a.

After the finished channeled nail wire 10" has left the second rolling step (VTII), nail head upsetting, pointing and separation of the individual nails is accomplished in a conventional manner.

As regards the characteristic angles for the finished cross-sectional shape of the nail shank, it can be mentioned that the angle α/2 between the surfaces 5 and the plane A (see FIGS. 2 and 2a) can suitably be 20°; meaning that the flank surfaces 5 form a 40° angle to each other. This last-mentioned angle corresponds to the angle α on the deepening roller 14 (see FIG. 5) and 14' (FIG. 5a) and 14" (FIG. 5b). The angle δ between the bottom surface halves 7' and 7" is suitably 150°, which means that the angle γ shown in FIG. 5 will be 15°.

Finally, it should be pointed out that the pointing of the nail can be done in various manners producing a more or less transversely cut-off point or a long nail point. The point can be two-, three-, four- or more-sided or alternatively, can be conical. Furthermore, the point can be symmetrical or asymmetrical in relation to the longitudinal center line of the shank. The nail head can also be symmetrical or asymmetrical relative to said center line, and the nail shank can be provided with friction-increasing patterns.

The invention can of course be varied and be given many alternative embodiments beyond those described above and shown in the drawings, and the invention encompasses all the embodiments and equivalent solutions lying within the scope of the following claims.

I claim:

1. A nail type fastener, comprising a straight elongated shank, the lateral surface of which comprises three separate lateral surfaces, there being at one end of the shank a head, while the other end of the shank has a point, characterized in that in each of said lateral surfaces a groove is made extending along the shank, said groove being defined transversely by two opposing side flank surfaces both of which connect via individual corners which are preferably sharp or of small radius, to the groove bottom surface which is, in section, a V-shaped bottom surface (7), the flat halves (7', 7") of which form an obtuse angle (δ) with each other, suitably an angle of 130 degrees to 170 degrees, preferably about 150 degrees, and that the lateral surfaces of the shank which are provided with grooves are separated from each other transversely by ridges running along the shank, with arcuate crosssectional outer contours.

2. The fastener according to claim 1 characterized in that the grooves have similar cross sectional shape and are situated symetrically with regard to the longitudinal centerline of the shank.

3. Fastener according to one of claims 1 or 2, characterized in that the greatest depth (h) of grooves (4) is preferably 10–30%, especially 20%, of the cross dimension (D) of the shank.

4. Fastener according to one of claims 1 or 2, characterized in that the bottom surface (7;17;27) of the groove has a width (T) which does not normally exceed 50% of the diameter (D) of the shank.

5. Fastener according to claim 1, characterized in that the angle (α/2) between an imaginary plane (A), containing the longitudinal center line of the shaft and the center line of the bottom surface, and the side flank surfaces (5) connecting to the bottom surface is acute, suitably approximately 10°–30°, preferably about 20°.

6. A fastener according to claim 5 characterized in that the greatest depth of said grooves is 10% to 30%, especially 20% of the cross dimension of the shank.

7. A fastener according to claim 5 characterized in that the bottom surface of the groove has a width which does not exceed 50% of the cross dimension of the shank.

* * * * *